Feb. 2, 1965  A. F. BADER ETAL  3,168,185
FEED APPARATUS
Filed July 26, 1962  2 Sheets-Sheet 1
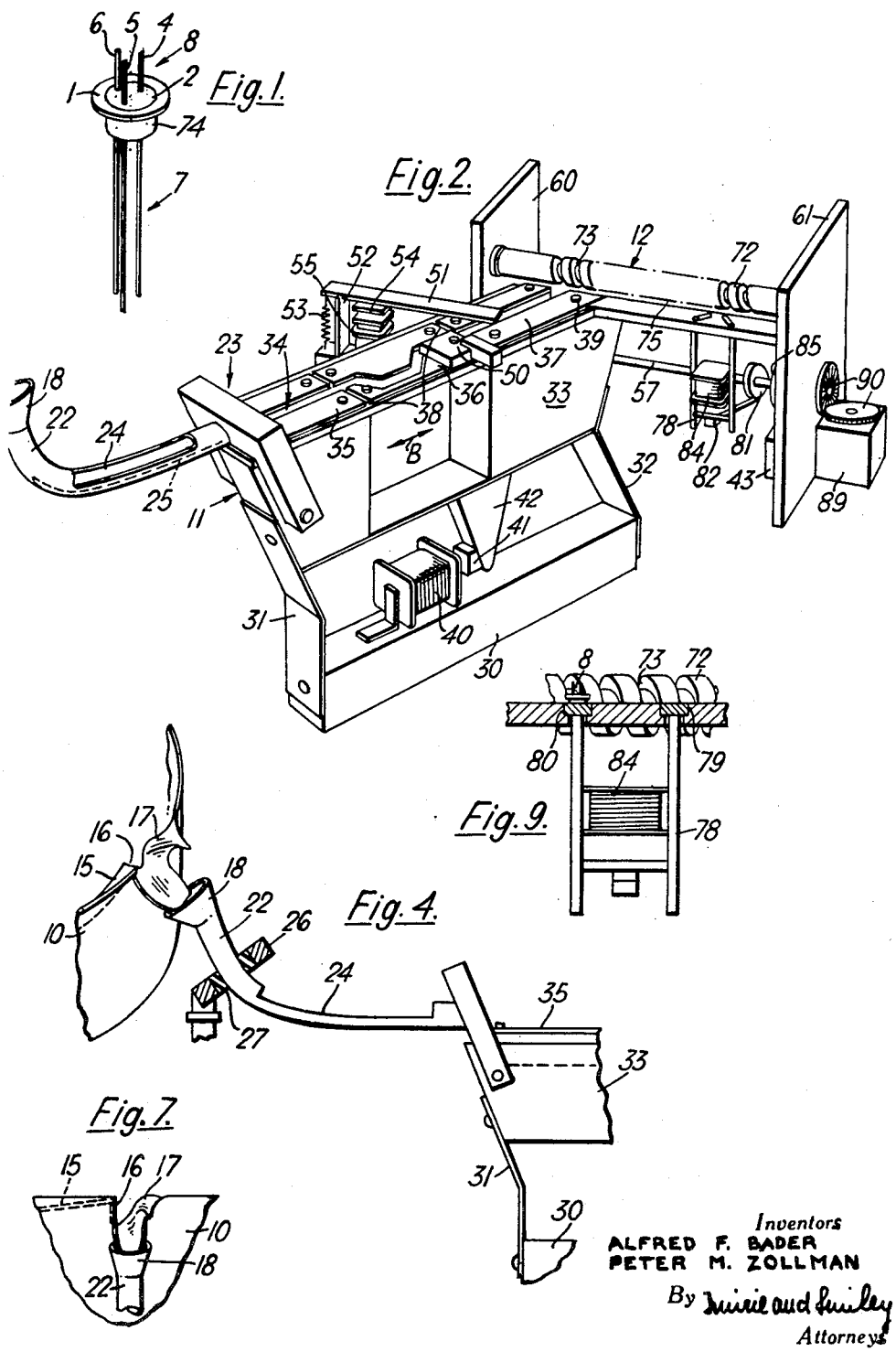
Inventors
ALFRED F. BADER
PETER M. ZOLLMAN
By *Mumie and Smiley*
Attorneys

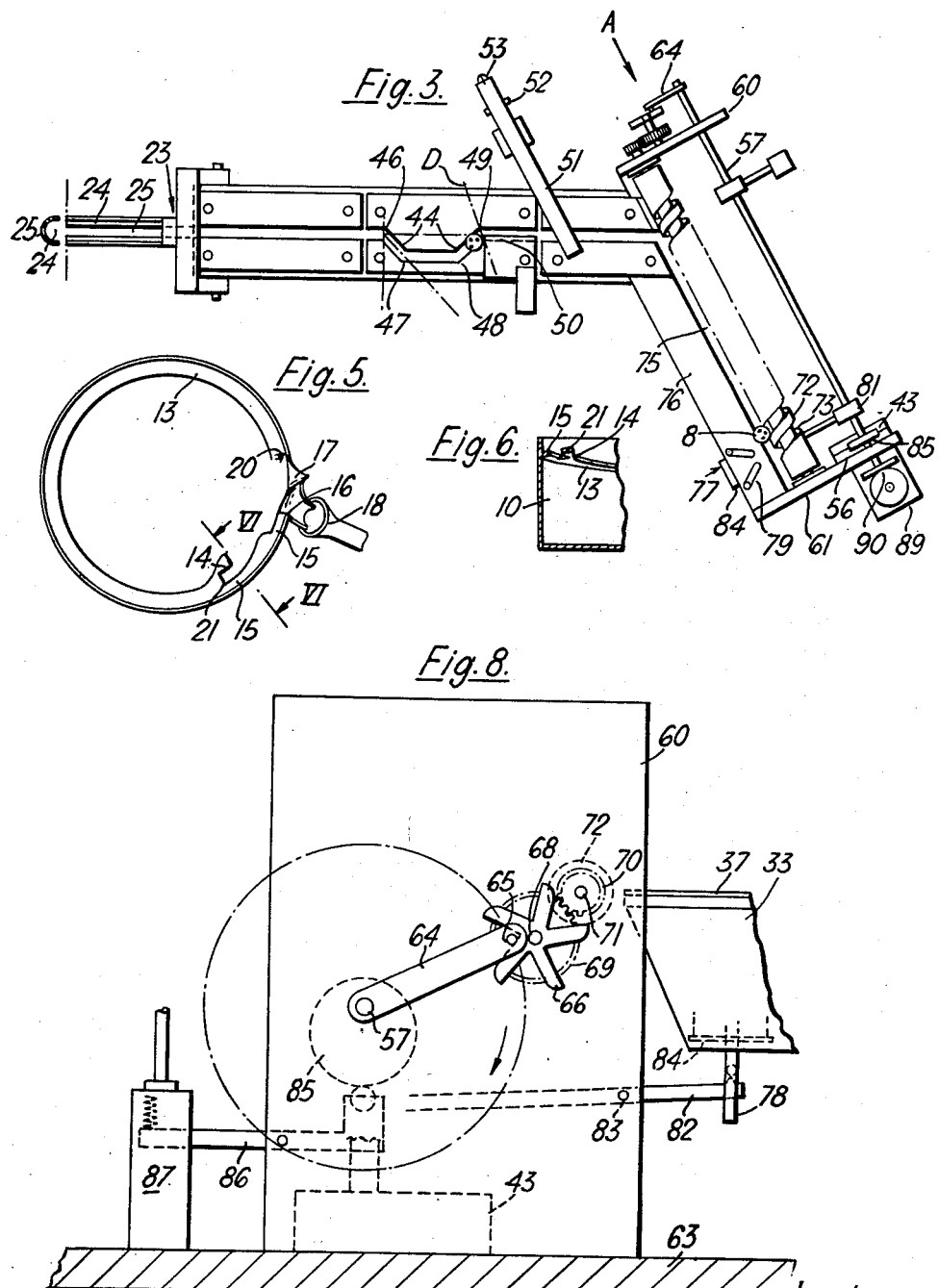

3,168,185
FEED APPARATUS
Alfred Frederick Bader and Peter Martin Zollman, both of Hersham Factory Estate, Walton-on-Thames, Surrey, England
Filed July 26, 1962, Ser. No. 212,692
Claims priority, application Great Britain July 26, 1961
9 Claims. (Cl. 198—33)

This invention relates to an apparatus for feeding articles, such as transistor headers, to a delivery point in correct angular orientation and spaced relationship at regular time intervals.

A transistor header comprises a flanged rim in which is secured a bead or disk of glass through which pass three generally parallel electrode wires, the wires being sealed into the disk and disposed equidistant from the rim and equidistant from each other with two substantially on the diameter of the disk, all the wires extending a short distance e.g. ¼ inch from the flanged side of the disk and a much longer distance e.g. 1½ inches on the opposite side of the disk. The headers are supplied to the transistor assembly plant in a jumbled and tangled condition with the wires sometimes bent.

Hitherto in the assembly of transistors, the headers have been loaded by hand on to the feed position of the assembling plant and are supported on their flanges with their longer wires extending downwardly, and are then fed in the machine to the first mechanism of the plant which may for example be the electrode cropping tools for cutting them to the correct lengths, and bending tools for shaping the wires to accurate configuration. This method of feeding the headers into the plant is slow and unsatisfactory in modern high speed assembling machinery.

The main object of the present invention is to provide an apparatus by which transistor heads or like shaped articles can be fed, from a random jumbled state, in correct angular orientation and regular spaced and timed relationship to the first station of an assembling machine e.g. the cropping and bending tools.

In order that the invention may be clearly understood one construction in accordance therewith will now be described with reference to the diagrammatic drawing accompanying the provisional specification in which:

FIG. 1 is a perspective view of a transistor head showing its flange 1, with the glass head or disk 2 sealed therein and three electrodes 4, 5, 6 sealed through the disk a longer distance on the lower side 7 than the upper side 8, and located 4, 5 on the diameter of the disk with the electrode 6 on one side of the electrodes 4, 5;

FIG. 2 is a perspective view of the transistor header or the like feeding apparatus;

FIG. 3 is a plan of the apparatus in FIG. 2;

FIG. 4 is a side partly perspective view of part of a bowl vibrator and the feed tube to the apparatus shown in FIGS. 2 and 3;

FIG. 5 is a plan view of the bowl vibrator;

FIG. 6 is a cross section on the line VI—VI of FIG. 5;

FIG. 7 is a detail of the bowl vibrator spout;

FIG. 8 is an enlarged scale and view of the worm drive looking in the direction of the arrow A in FIG. 3; and FIG. 9 is a partial cross-section showing the header lifting device at the delivery point of the apparatus.

In the drawings the same references are used to designate the same parts throughout the figures.

Referring to FIGS. 2–4, the transistor header feed apparatus has a bowl vibrator 10 into which the jumbled headers are fed in bulk, a vibratable elongated track 11 and a feed device 12.

The bowl vibrator 10 has a flat bottom from which a spiral track or flight 13 rises round the wall, tilted inwardly, and near the top of the bowl wall broadening outwardly at 14; beyond the part 14 the part 15 of the flight is narrow to accommodate one header disposed end to end thereon, the final narrow part leading over a sharp edge 16 into a spout the far surface 17 of which is of a particular shape as will be described and leads to a funnel 18.

When a header moves along the flight part 15, wires 8 leading, the flange and disk ride off the end of the flight and the header topples over into the spout and falls into the funnel 18. If the header reaches the spout with wires 7 leading, the flange and disk keep the wires horizontal and the ends of the wires 7 ride along the inwardly curved surface 17 of the spout thereby toppling the header back into the bowl 10. If two headers move along flight part 15 with their wires 7 facing each other and entangled, the leading header cannot topple over into the spout and hence is deflected by the surface 17 and both headers fall back into the bowl.

The effect of the flight is to allow some headers to ride up from the flight start 20 on the bottom of the bowl, but the tangled mass of headers rides up until reaching the part 14 which throws the mass off, a few dropping through or near the slot 21 to a marginal piece of the bowl bottom free of the mass of headers due to the part 14 and hence moving easily to the start 20. The bowl may be vibrated in any conventional manner as by an electric motor, which requires no further explanation here, or any other conventional vibrating device.

The funnel 18 leads into a tube 22 leading into a loading point 23 of the vibrator device 11. The tube is open at 24 and has a slot 25 in its bottom wide enough to permit the electrodes 4, 5, 6 to pass through but to hold the flange 1 of the headers. The tube 22 is supported by a bracket 26 on the vibrator 11, through a resilient mounting 27 so that the funnel does not vibrate. As the headers fall through the funnel 18 into the tube 22 the parts 7 of the electrodes swing down through the slot 25 and the headers all move vertically to the vibrator 11.

The vibrator 11 has a base 30 on which are secured two resilient members 31, 32 e.g. of spring steel, to the upper ends of which is fixed a mount 33 capable of oscillation longitudinally and horizontally as shown by the double arrow B in FIGURE 2. The base 30 supports the coil 40 of an electro-magnetic member, the armature 41 of which is fixed to a bracket 42 on the mount 33 so that the coil 40 is energised by closing a micro-switch 43 by a cam on the main drive shaft to be described.

On the upper surface of the mount 33 is a track 34 formed of three sections 35, 36, 37 separated by gaps 38 as wide as the full stroke of the mount vibrations and adjustable by grub screws 39 of the like. The first track section 34 is straight and the headers reaching the loading point 23 move in short hops along the section 34. Section 35 has a double S-bend 44 the angle of which is 45° but it has been found that while 45° is the optimum angle, angles of 40° to 50° are satisfactory. As the headers round the first bend 46 they rotate anticlockwise seen from above, but this is reversed at the angle 48, due to the cylindrical portions 74 of the headers being alternately struck by opposite walls of the slot at each bend 44 during reciprocation of member 33, the blows of opposite walls of each bend tending to turn the headers in one direction while the blows of opposite walls of the slot of the next bend tend to turn the headers in the opposite direction. This reversal of rotary movement is accentuated by the successive headers rolling one against the other to rotate each other in opposite directions.

At the centre of the bend 49, i.e. on the line D bisecting the angle of the bend and on the centre line of the track 34 in section 37, is a plough device 50 raised sufficiently above the section 37 to permit the unwired half of the header flange and disk to pass beneath, but permitting the wires 4, 5, 6 to pass along the track 34 beside the plough to the feed member 12.

The headers can only pass along beside the plough if properly orientated and this is when the wires 4, 5 engage the plough with the wire 6 in the part of the track 34 not blocked by the plough.

As the rotating headers reach the plough they have been orientating themselves and if appropriately disposed they move along the plough, but if they are not orientated they hit the plough and bounce back, thus rotating against and with the next header and this hit and miss continues until the header passes the plough which occurs without serious delay in practice.

To avoid overloading at the end of the track 34 it is desirable to halt the bowl 10 vibration and for this purpose an overfeed control is provided. This overfeed control has an arm 51 fulcrumed on a support 52 and urged upwards by a spring 53. Below the arm 51 is a microswitch 54 in the circuit of the bowl 10 vibrator. On the support 52 is an electro-magnet 55 energized through a micro-switch e.g. 56 actuated by a cam on the main drive shaft 57. When the electro-magnet 55 is operated the arm 51 is pulled down and if a header is beneath the arm 51 the switch 54 remains open and the bowl 10 is idle, but if there is no header beneath the arm 51, that arm drops, closes the switch 54 and the bowl 10 restarts the vibratory header feed to the spout 16.

The feeder device 12 seen in FIGURES 1, 2, 7 and 8 has a frame formed of upright plates 60, 61 fixed to the base 63 of the apparatus (FIGURE 8) and between these plates the main drive shaft 57 is journalled. Shaft 57 extends beyond the plate 60 and carries an arm 64 having a pin 65 engaging the arms of a five armed Geneva wheel 66 fast on a shaft 68 journalled in the plate 60. The shaft 68 carries a pinion 69 meshing with a pinion 70 on the shaft 71 of a feed worm 72. The construction of the wheel 66, arm 64 and pin 65 is such that at each revolution of the shaft 57 the pin engages every other arm of the wheel 66 so that a feed ratio of 2:5 is established, the worm 72 has a spiral track 73 therealong of a width to receive the part 74 (FIGURE 1) of the header. The worm is spaced by a gap 75 from a guide plate 76 to form a track along which the orientated headers leaving the track 34 pass to the delivery point 77. The gap 75 is the width of the track 34 so that from the end of track 34 the headers are picked up by the worm which moves them step by step along the gap 75, one in each spiral of the track 73 with the flange 1 slightly raised off the top of the guide 76 and above the spiral track of the worm, the headers remaining orientated by the wires 4, 5 sliding along the edge of the guide 76.

At the delivery point 77 is a delivery device formed of two rods 78, FIGS. 3 and 8, sliding vertically in bores in the guide 76 and having two arms 79, of magnetizable material such as Swedish steel, normally resting in slots 80 in the guide, the weight of the device urging it to rest. A cam 81 on shaft 57 moves an arm 82 about its pivot 83, supported on the apparatus frame, to raise the rods 78. On the rods 78 is an electro-magnetic device 84 energized from a micro-switch actuated by a cam (not shown but similar to cam 85 operating switch 43) on shaft 57 to energise device 84 as soon as the arms 79 engage a header and to de-energise it as soon as they lower again and break contact with the header so that no flux flows between the arms 79 when not engaging a header. The delivery device 77 raises the headers to the tools of, for example, the cropping and bending machine and receives them back from the tools so that they can be ejected in succession from the worm, or they may be removed from the raised arms 79 as desired. The headers act as a keeper to retain the flux flowing between the arms 79.

A cam 85 on shaft 57 pivots a lever 86 to actuate an air valve 87 for causing operation of the succeeding apparatus, e.g. the cropping and bending machine, or any other apparatus actuated in timed relation to this feed apparatus. The shaft 57 is driven continuously from a motor 89 through a friction drive 90.

In an alternative construction the two sides of the track could be vibrated asymmetrically as by oscillating at different frequencies, and/or the upper surfaces of the two sides of the track could have different coefficients of friction which would cause the headers to rotate as they bounce along the vibrating track 34.

The feed by the feed device is positive so that the headers always move in the desired spacing and timing for the delivery at the point 77. The oblique, e.g. 120°, angle of the worm 72 to the track 34 is found to be the optimum feed angle, but other arrangements of the worm and track 34 even in alignment can be used.

The control arm 51 is connected to a relay switch which trips a second relay switch (not shown) in the bowl 10 vibrator circuit so that a momentary downward movement of the arm 51 will stop or restart the bowl vibrator.

All parts of the apparatus engaged by the headers are highly polished so as to offer the minimum of frictional resistance to the headers in their movement.

We claim:

1. An apparatus for feeding devices such as transistor headers comprising an orientating device having an elongated slotted track along which the headers can move in succession with their flanges supported on the track and their longer electrode wires extending down through the track slot, means for effecting longitudinal vibration of the track to cause the headers to move therealong, at least one bend in the track the angle of which is such that the headers moving by the vibration round the bend will carry out a rotary orientating motion, a plough device blocking one side of the track at the last track bend whereby only headers which by rotation are correctly orientated can continue along the track, and a progressive feed device having spaced header receiving means disposed therealong in and by which the headers or the like are fed in succession in spaced relationship and at regular time intervals to a delivery point.

2. An apparatus according to claim 1 wherein the plough device is disposed so that the upstanding electrodes are confined to the unblocked part of the track with the flange and disk partly located beneath the plough device.

3. An apparatus according to claim 1 wherein the track is provided with a double S bend in which the headers are caused to rotate always in the same direction at each bend but in opposing directions at succeeding bends, contiguous headers thereby rotating in opposite directions at the second bend by frictional engagement with each other as well as by the vibration of the track.

4. An apparatus according to claim 1 wherein the feed device comprises a rotatable worm at an oblique angle e.g. 120° to the vibratory track and having a spiral track therein, the worm being spaced from a guide parallel thereto, the pitch of the worm and the width of the track, with the width of the space between the worm and the guide, being sufficient to accept the orientated wires of the headers but narrower than the flange of the header flanges thereby feeding the headers one by one from the linear vibratory track in spaced and timed relation and delivering them to a delivery point.

5. An apparatus according to claim 4 wherein the distance between the worm and the guide is such that the two electrodes on the diameter of each header will slide therealong while the third electrode is engaged in the spiral track of the worm thereby maintaining correct orientation of the headers as they are fed in spaced relationship to the delivery point.

6. An apparatus according to claim 4 wherein the worm drive shaft carries actuating means by which the various members of the feed apparatus are operated in synchronisation.

7. An apparatus according to claim 4, wherein is provided a compressed air valve to release the air supply in timed relation to the feed mechanism to operate the tools at the header delivery device at the delivery point, a lever for actuating said air valve, and a cam on said drive shaft engaging said lever.

8. An apparatus according to claim 1 wherein the delivery device preferably comprises a sliding member raised and lowered by a fulcrumed lever actuated by a cam mounted on the main drive shaft and carrying an electro-magnetic element energised by actuation of a micro-switch from a cam on the main drive shaft such that the current is not switched on until the headers are raised slightly and it is switched off just before the headers are removed from the delivery device, the delivery device having arms of a magnetisable material e.g. Swedish steel so that during the major part of the lifting of the delivery device while holding a header against any movement the arms will hold the header by magnetic attraction since the flux between the arms will pass through the flange of the header.

9. An apparatus according to claim 1 wherein an over-feed control is provided comprising a vertically reciprocal arm which in the lowered position will close a switch to energise a relay in the circuit of the current supply to the electro-magnetic device or electric motor driving the bowl vibrator, the vertically reciprocatable arm having its outer end above and downwardly movable to engage the orientated headers in the linear track alongside the plough so that should any headers be beneath the device as it drops it will be prevented from closing the switch and thereby maintain the bowl vibrator out of action and prevent over feeding of headers to the linear vibrator.

References Cited in the file of this patent

UNITED STATES PATENTS

| 1,750,329 | Patchen | Mar. 11, 1930 |
| 2,101,924 | Turnquist | Dec. 14, 1937 |
| 2,571,576 | Hopkins | Oct. 16, 1951 |
| 2,904,162 | Simer | Sept. 15, 1959 |

OTHER REFERENCES

IBM Technical Bulletin-Transistor Transporting App. by L. J. Parodi.